May 1, 1923.

M. LUBASH 1,453,400

PULLEY

Filed May 17, 1920

WITNESSES

Martin Lubash
INVENTOR

BY

ATTORNEY

Patented May 1, 1923.

1,453,400

UNITED STATES PATENT OFFICE.

MARTIN LUBASH, OF RICHMOND HILL, NEW YORK, ASSIGNOR OF ONE-HALF TO JAMES FITZSIMMONS, OF BALDWIN, LONG ISLAND, NEW YORK.

PULLEY.

Application filed May 17, 1920. Serial No. 381,857.

*To all whom it may concern:*

Be it known that I, MARTIN LUBASH, a citizen of the United States of America, residing in Richmond Hill, county of Queens, city and State of New York, have invented certain new and useful Improvements in Pulleys, of which the following is a specification.

This invention relates to pulleys and aims to provide certain improvements therein.

The invention is particularly directed to a pulley having a safety device by means of which, if the rope or cable breaks, it will be automatically engaged by the pulley so that the load is not dropped. The device is useful in many different connections such, for instance as the ordinary clothes line, hoisting devices of various kinds wherein blocks having a number of sheaves are employed, etc. According to the invention in its preferred form, the pulley or sheaf is provided with a centrifugal element which is adapted to be thrown out by the rapid movement of the pulley which takes place when the cable or rope is suddenly broken, the centrifugal device preferably setting a clamping or jamming member which engages the cable or rope. The invention includes other features of improvement which will be hereinafter more fully described.

Referring to the drawings which show several embodiments of the invention,—

Figure 1:
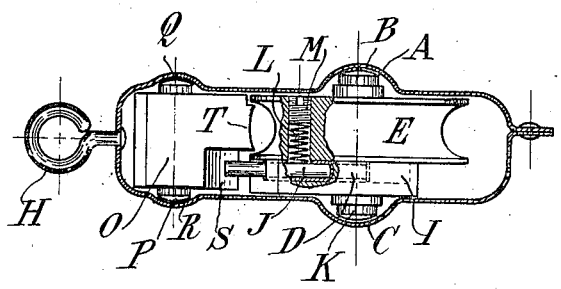
Figure 1 is a sectional view of the pulley housing showing the pulley partly in section.
Figure 2:
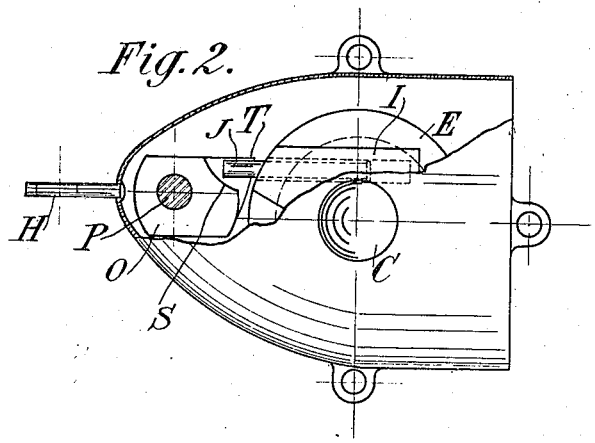
Fig. 2 is a view taken at right angles to Fig. 1, showing the pulley and elevation and the housing broken away.
Figure 3:
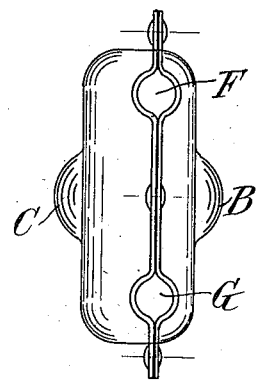
Fig. 3 is an end or bottom view of the complete device.

Referring first to Figs. 1 to 3, let A indicate the housing which, in this case, serves as the frame of the pulley. In the construction shown which is designed for light work such as clothes lines, the frame is struck up out of sheet metal and is provided with depressions B, C, adapted to form bearings for the pulley shaft D. Preferably, the shaft is stationary and the pulley turns around it. The pulley which is indicated by the reference letter E, may be of any ordinary type constructed of metal or wood as desired. Preferably, it has the usual concave face for the reception of a rope. The housing, for the purpose described, or for analogous uses, may be made with a pair of openings F, G, (Fig. 3) through which the rope or cable passes. By this construction the pulley is substantially entirely enclosed and is protected to a very large extent from rain, dust, etc.

The housing is best provided with an eye H by means of which the pulley may be fastened to any convenient point.

At one side of the pulley E is provided an enlargement I which may be cast or otherwise formed integrally with the pulley or may be fixed thereto. The function of this enlargement is to provide suitable housing for the safety operating device J. In the construction shown, this is constructed as a centrifugal element in the form of a pin which normally is housed in a bore K, frictional means being best provided for yieldingly holding the pin in its innermost position. In the construction shown, this friction device comprises a spring L which is held in a transverse bore in the pulley by a screw M.

In the case of a clothes line wherein the clothes are hung on the underside of the line or what may be termed, the lower rope, it is found in practice that almost invariably, in case of breakage, the break will occur on the upper rope. When this happens, the weight of the loaded line tends to cause the upper rope to travel rapidly around the pulley, thus speeding up the latter to an extent which will cause the centrifugal pin to be thrown outwardly. This projection of the pin is utilized according to the present invention to actuate or set a clamping device to stop the travel of the line. In the simplest form, this clamping device comprises a pivoted dog which when engaged and pressed by pin J, frictionally engages the line and forces it against the pulley, thereby preventing further movement. As the dog has a limited play, when is reaches the end of its movement, parts are jammed together in such way as to prevent further traveling of the rope.

The preferred form of catch is illustrated in the drawing being indicated by the reference letter O. As so illustrated, it comprises a pivoted dog having a shaft P held in depressions Q and R in the pulley frame or housing. The dog has a striking face S which is adapted to be engaged by the pin J, thereby forcing the dog to tilt and bring its engaging face T into engagement with the rope. The dog is forced around until it engages the housing (or a suitable stop may be provided) at which point the rope becomes jammed.

Figure 4:
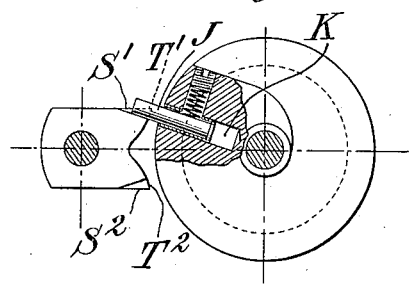
Fig. 4 illustrates a modification.

In use of the device shown in Figs. 1 to 3, the pulley is arranged with the striking face S upwardly and the complemental pulley at the other end of the line is similarly arranged. In Fig. 4 I have illustrated a construction in which the dog will work in either direction, the latter being provided with two striking faces S', S² and two engaging faces T', T².

In either form, the dog and pulley are so relatively formed and proportioned that the rope runs freely past the smooth surface of the dog during ordinary use. More specifically stated, the angle between a line joining the pivotal centers of the dog and pulley and a line tangent to the surfaces of the dog and a rope running over the pulley, at their common point of contact, is sufficiently less than a right angle, that is, sufficiently acute, to permit the rope to pass freely under the dog without causing the same to be drawn into clamping relation. This angle depends upon the coefficient of friction for the materials in contact and would differ for different materials but may be determined by experiment or by reference to standard text books.

In view of the above described relation between the dog and the pulley, the dog alone would afford no obstruction to the movement of the rope over the pulley in either direction. When struck by the pin, however, the dog is positively forced into and held in jamming relation with the rope, thereby preventing further movement of the rope and pulley in the direction which maintains the pin in contact with the dog.

While I have shown and described several embodiments of the invention, it will be understood that I do not wish to be limited thereto, since various changes may be made therein without departing from the spirit of the invention.

What I claim is:—

1. In a pulley, the combination with a sheave for a rope, and a clamping device normally ineffective to prevent relatively slow movements of said rope over said sheave in either direction, of means rendered effective by an abnormal movement of said rope in one direction due to breakage, to cause said clamping device to clamp said rope and sheave and prevent further movement in the same direction.

2. In a pulley, the combination of a sheave, and a clamping means for the rope and means for operating the clamping means, and centrifugal means for operating the clamping means when the rope breaks.

3. In a pulley, the combination of a sheave, a pivoted dog, and a centrifugal means for operating said dog to clamp the rope when the speed of the pulley is increased.

4. In a pulley, the combination of a sheave, a pivoted dog, and a centrifugal means for operating said dog to clamp the rope when the speed of the pulley is increased, said centrifugal means comprising a reciprocating pin.

5. In a pulley, the combination of a sheave, a pivoted dog, and a centrifugal means for operating said dog to clamp the rope when the speed of the pulley is increased, said centrifugal means comprising a reciprocating pin and means for frictionally retarding said pin.

6. In a pulley, the combination of a sheave, a centrifugal member adapted to operate when the speed of the sheave becomes excessive, and means adapted to engage the rope, said means being operated by said centrifugal means, and said engaging means being adapted to operate in either direction.

In witness whereof, I have hereunto signed my name.

MARTIN LUBASH.